United States Patent [19]

Tanis

[11] Patent Number: 4,762,978
[45] Date of Patent: Aug. 9, 1988

[54] AIRCRAFT BATTERY ASSEMBLY

[76] Inventor: Peter G. Tanis, R.R. 1, Glenwood, Minn. 56334

[21] Appl. No.: 888,766

[22] Filed: Jul. 22, 1986

[51] Int. Cl.⁴ ............................................. H05B 3/36
[52] U.S. Cl. .................................. 219/209; 219/521; 219/528
[58] Field of Search ............... 219/202, 209, 210, 528, 219/529, 548, 549, 521, 385, 386, 387

[56] References Cited

U.S. PATENT DOCUMENTS

| | | | |
|---|---|---|---|
| 1,266,780 | 5/1918 | Edison | 219/521 |
| 2,516,048 | 7/1950 | Endress | 219/209 |
| 2,626,971 | 1/1953 | Mansoff | 219/209 |
| 2,710,909 | 6/1955 | Logan | 219/528 |
| 2,938,992 | 5/1960 | Crump | 219/528 |
| 3,110,633 | 11/1963 | Bachmann | 219/209 |
| 3,334,216 | 8/1967 | Illingworth | 219/528 |
| 3,470,350 | 9/1969 | Lewis | 219/211 |
| 3,527,925 | 9/1970 | Toyooka | 219/521 |
| 3,649,366 | 3/1972 | Jordan | 219/209 |

FOREIGN PATENT DOCUMENTS 153046  4/1952  Australia ............................ 219/209

Primary Examiner—H. Broome
Assistant Examiner—Teresa J. Walberg
Attorney, Agent, or Firm—Burd, Bartz & Gutenkauf

[57] ABSTRACT

An aircraft battery assembly to provide a preheated battery to facilitate aircraft operation in cold temperature. The battery assembly includes a battery housed in a battery box and having a heating jacket wrapped around it. The heating jacket is elongate and rectangular with a width less than the height of the battery and a length sufficient to wrap around the battery with vertical edges that approach one another near a quarter of the battery. The edges have grommets with eyelets. The grommets of the respective edges are laced together to secure the jacket around the battery. The jacket is comprised of inner and outer insulative layers with a heating element sandwiched between them. The jacket is very thin so as to be able to readily turn the corners on the battery. The heating element is operated responsive to a thermostat sensing temperature.

5 Claims, 2 Drawing Sheets

AIRCRAFT BATTERY ASSEMBLY

BACKGROUND OF THE INVENTION

Aircraft batteries are, of necessity, as compact as possible due to space constraints, particularly aboard private aircraft. In cold weather, batteries need to be heated for optimal performance and, in severe cold, for any performance at all. The lead-acid batteries installed in aircraft lose a high percentage of their cranking capacity in cold weather. At −40 degrees F., approximately 10 percent of the battery capacity is available for starting. At low temperatures, the battery is unable to be recharged but rather takes on a "surface charge" which causes a battery voltage increase, shutting down the aircraft charging system. Multi-engine aircraft are often able to start one engine but then are unable to start the second one, even though the generator is "on line". A partially charged battery is subject to freezing.

The aircraft battery is more lightly built than automobile batteries and is sized to the minimum needs of the aircraft. This is done to save weight. In cold weather, the aircraft is short on battery power. Since the cold battery does not recharge readily, the aircraft voltage regulator is set to put out more voltage in cold weather. This helps until the engine compartment warms up, then the charging system "backs off". After engine start, if an aircraft loses its generating system, a pilot can normally expect about an hour of operation of critical flight systems from the battery at normal operating temperatures. In cold weather, the operational time may be reduced to a few minutes due to the surface charging of the battery.

The aircraft battery needs preheating in cold weather, but this is difficult to accomplish because of its fragile nature and the places in which it is installed. The battery is normally in a sealed box with drains and vents. Sometimes this box is made of plastic which melts when heated. Burning light bulbs have been placed proximate the battery to preheat it. This provides only localized heat and poses the danger of fire. The use of hot air blowing preheaters is only marginally effective and requires some dismantling and assembling of the aircraft. Automotive-type battery warmers are designed for larger batteries and have poor temperature regulation.

SUMMARY OF THE INVENTION

The invention pertains to an aircraft battery assembly including an aircraft battery, a battery box and a heater for the battery. The heater is thermostatically controlled and electrically powered from a remote source. The heater includes a sheet-like rectangular jacket with a height just less than that of the battery and a length approximately equal to the battery circumference to surround the sides of the battery. The vertical edges of the jacket have eyelets which are laced together to hold the jacket in contact with the battery. The jacket and battery are placed in the battery box with a power lead extending from the jacket to outside of the box. The jacket is made of inner and outer layers of insulative material with a flexible heating element between them. A wiring harness has a lead connected to the jacket and another connected to the power source. Another lead is connected to a thermostat to turn power on and off to the jacket. The thermostat closes when it senses a predetermined low temperature. In one form of the invention, the thermostat is installed on the aircraft skin and senses ambient temperature. In another form of the invention, the thermostat is placed in proximity to the battery top to sense the temperature there.

IN THE DRAWINGS

DESCRIPTION OF A PREFERRED EMBODIMENT

Figure 1:
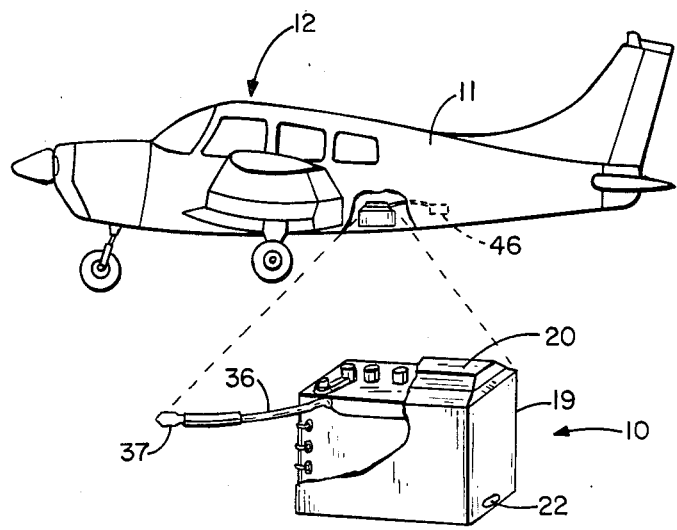
FIG. 1 is a side elevational view of a single-engine private aircraft with a portion broken away to show the battery location and showing the battery assembly of the invention, in exploded view, apart from the aircraft.

Referring to the drawings, there is shown in FIG. 1 an aircraft battery assembly indicated generally at 10 compactly installed in the fuselage 11 of a private single-engine aircraft 12. Battery assembly 10 provides a safe, preheated battery for use in low temperature environments for low temperature flight operation whereby upon initial operation of aircraft 12, the battery is at or near a fully charged state and will remain fully charged under operation of the aircraft generating system.

Battery assembly 10 includes an aircraft battery 14 (FIGS. 1 and 2) of the usual type having cell caps 15 and terminal posts 16. A battery heater 18 is installed on battery 14 and both are placed in a battery box comprised of a box-like housing 19 closed by a cover 20 and having the usual drain and vent openings 22.

Battery 14 is the normal rectangular box configuration. Battery heater 18 includes an elongate jacket 23 configured to be wrapped around the sides of the battery 14. Jacket 23 has a height less than that of battery 14 and a length to be almost wrapped around the battery 14. Vertical edges 24, 25 of jacket 23 are equipped with a plurality of vertically aligned grommets 27, 28 respectively. When the jacket 23 is wrapped circumferentially around the battery 14, the edges 24, 25 are located proximate one corner of the battery 14. Lacing 29 is passed through the respective grommets or eyelets 27, 28 of edges 24, 25 to fasten the jacket 23 to the battery 14. Lacing 29 can be comprised of one continuous lace or of individual laces passing through corresponding grommets on the edges 24, 25 of the jacket 23.

Figures 2A, 8:
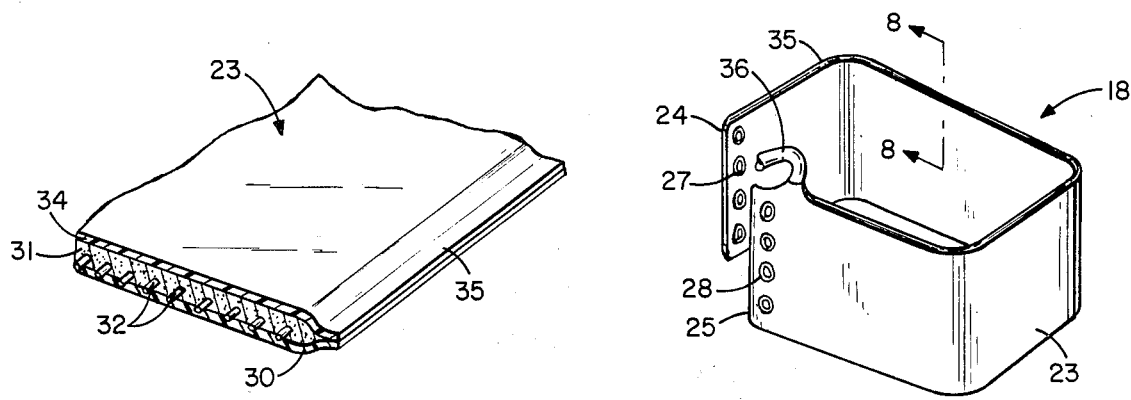
FIG. 2A is a view in perspective of the heater jacket of the battery assembly of FIG. 2.
FIG. 8 is an enlarged sectional view of a portion of the heating jacket of FIG. 2A taken along the line 8—8 thereof.

Jacket 23 is comprised of an electrically activated, flexible heating element embedded in protective layers of suitable flexible, insulative material and comprised of a thickness small enough to wrap around battery corners without damage and fit within the battery box housing 19 when wrapped around battery 14. An example of such structure is shown in FIG. 8, although equivalent structure could be used. Jacket 23 includes a first or inner layer 30 of suitable insulative material, such as silicone rubber impregnated glass fiber fabric. A second or middle layer 31 comprises an electrical heating element constituted as a nichrome wire grid 32 embedded in silicone rubber. A third or outer layer 34 is constituted as another layer of silicone rubber, impregnated glass fiber fabric. At the edge of jacket 23, the first and third or inner and outer layers 30, 34 are heat-sealed, bonded, or otherwise suitably joined, as shown at edge 35 in FIG. 8 to protect and isolate the middle layer 31. The first, second and third layers together can comprise the thickness of approximately 0.075 inches (0.190 cm) whereby jacket 23 is readily wrapped around battery 14 without damage at the corners and occupying minimal space.

Sleeve 23 is conveniently constructed by laying out the proper length of the first layer of uncured silicone, impregnated glass fiber cloth. The nichrome wire grid is laid out on the first layer. The third layer of uncured silicone, impregnated glass fiber cloth is laid over the nichrome wire grid. The composite is placed in a heated mold under a pressure of 30 to 50 pounds per square inch and heated to 325 degrees F. for 15 minutes to cure the silicone.

A jacket power lead 36 is bonded into the composite structure connected to the nichrome wire grid at the time the jacket is cured in the heated mold. When the battery and jacket are installed in the housing 19 of the battery box, the power lead 36 exits through a suitably provided opening and has an end plug 37 for connection to a wiring harness, as will be described, for connection to an external power source, typically a 110 volt AC circuit.

Figure 2:
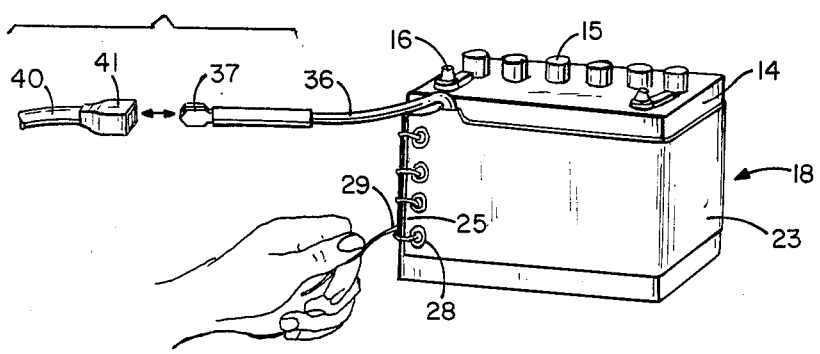
FIG. 2 is an enlarged view of the battery assembly of FIG. 1 without the battery case and showing installation of the heater jacket on the battery.
Figure 3:
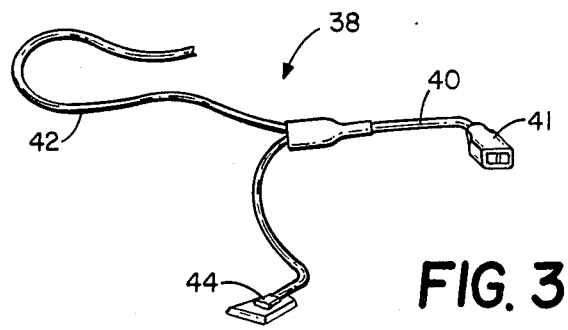
FIG. 3 is a perspective view of the wiring harness of the battery assembly.
Figure 4:
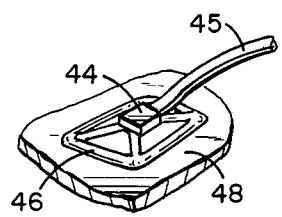
FIG. 4 is a perspective view of one form of thermostatic switch according to the invention.
Figure 5:
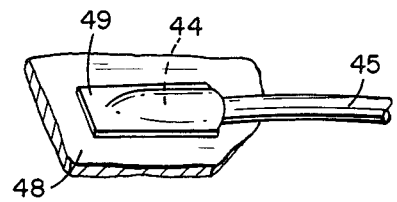
FIG. 5 is a perspective view of another form of a thermostatic switch for the battery assembly of the invention.

Power to jacket 23 is thermostatically controlled and supplied through a wiring harness 38, shown in FIG. 3. A second power lead 40 has a plug 41 for connection to the plug 37 of the jacket power lead 36 (FIG. 2). The second power lead 40 is connected to a main power lead 42, which extends to the remote power source (not shown). A thermostat lead 45 is connected to a thermostat 44 at one end. The opposite end of the lead 45 is connected between the main power lead 42 and the second power lead 40, whereby thermostat 44 controls the flow of electricity from the remote power source to the jacket 23. The thermostat 44 is operative to energize the power connection between the remote power source and jacket 23 when the temperature sensed by it drops to a predetermined value, such as freezing. Thermostat 44 is placed in a position whereby it will sense ambient temperature. In the configuration shown in FIGS. 3 and 4, thermostat 44 is connected to a mounting plate 46. Mounting plate 46 is glued or riveted or otherwise joined to the interior of the surface skin of the aircraft, as indicated in FIG. 1. When the temperature sensed by the thermostat 44 reaches freezing, the thermostat closes the circuit between the main power lead 42 and the second power lead 40 to energize the jacket 23 to provide heat to the battery 14 by conduction through the sides of the battery. FIG. 5 shows an alternative method of mounting the thermostat 44 to the skin 48 of the aircraft, whereby the thermostat is encapsulated in silicone, impregnated fiber glass sheath 49, which is bonded to the aircraft skin 48.

Figure 6:
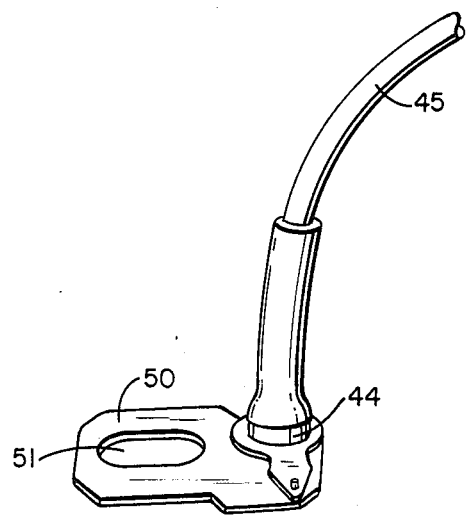
FIG. 6 shows a third form of thermostatic switch for connection to the battery.
Figure 7:
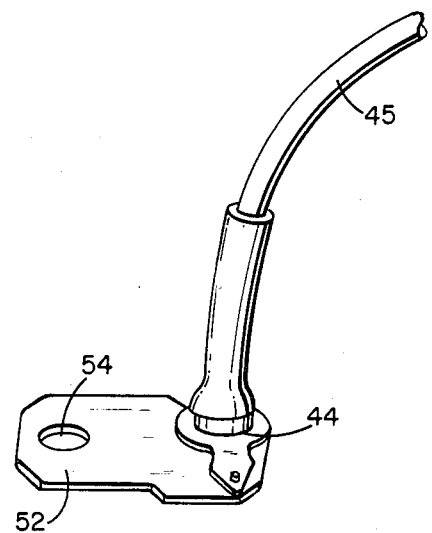
FIG. 7 is a fourth form of thermostatic switch for connection to the ground post on a battery.

An alternative method of temperature control is a thermostat secured proximate the battery. In FIG. 6, there is shown the thermostat lead 45 having the thermostat 44 secured to a clamp 50 adapted to be secured to the vent cap of the aircraft battery. In FIG. 7, there is shown a thermostat power lead 45 connected to a thermostat 44, connected to a clamp 52, adapted to be fixed to the ground post of the aircraft battery. In these two instances, the thermostat senses the temperature at the top of the battery case.

Heating element 32 is constituted to provide the correct amount of heat to battery 14 according to the size of battery. The surface temperature of jacket 23 is limited in the event that it becomes detached from the battery in order to avoid melting of the plastic battery cases or doing other damage. This is accomplished by limiting the watt density of heating element 32 to 0.5 watts per square inch of heated area. In addition, the total wattage of the heating element 32 is preferably matched to the size of battery to be heated so that in the event of thermostat failure, the battery will not be damaged by overheating. A total wattage in the range of 0.9 to 2.0 watts per pound of battery is a safe range.

In use, the battery assembly 10 is installed in the aircraft 12 and secured therein in the usual fashion in fuselage 11. The thermostat is connected to the aircraft skin, as indicated at 46 in FIG. 1. The jacket power lead 36 is connected to the second power lead 40 of the wiring harness 38, which is connected by main power lead 42 to a remote power source. When the thermostat 44 senses a reduction in temperature to a predetermined limit, such as freezing, it permits energization of the jacket 23 through the main power lead 42 and second power lead 40. The heating element 32 provides heat to the battery 14 through the sides thereof being snugly in contact thereof through the first layer 30. Jacket 23 is installed on the battery 14 by wrapping it around the sides of the battery 14, such that the edges 24, 25 approach one another proximate a corner of the battery. Lacing 29 is used to secure jacket 23 in place. If the jacket 23 is detached from the battery 14, the total heat generated will not be enough to cause significant damage to the battery box or other surrounding items. In the event of thermostat failure, the heat generated overall by the jacket 23 will not permanently damage the battery 14.

Alternatively to connecting the thermostat to the skin of the aircraft, it can be connected inside the battery box at the top of the battery to sense the temperature immediately proximate the battery.

While there has been shown and described a certain embodiment of an aircraft battery assembly according to the invention, it will be apparent that certain changes and deviations can be had without departing from the scope of the invention.

The embodiments of the invention in which an exclusive property or privilege is claimed are defined as follows:

1. An aircraft battery comprising:
  a battery box including a box-like housing with an open top and a cover that fits on the top to close the top;
  an aircraft battery having dimensions to be closely accommodated within the housing;
  a battery heater including an elongate, flat, generally retangular jacket approximately 0.075" thick wrapped around the battery, having a width less than the height of the battery and a length approximately equal to the circumference of the battery, said jacket having first and second vertical edges having vertically aligned eyelets, lace means interconnecting the eyelets on the first and second edges of the jacket to secure the jacket to the battery;

said jacket comprised of inner and outer layers of silicon rubber impregnated glass fiber fabric and a flexible heating element of nichrome wire grid imbedded in a layer of silicon rubber disposed between the inner and outer layers of flexible material, said nichrome wire grid providing a watt density of 0.5 W. per square inch of jacket area;

a heating jacket power lead extending from the heating jacket outward of the battery box for extension to a remote power source; and thermostat means connected to the heating jacket operative to turn power on and off to the jacket responsive to the ambient temperature, said thermostat means including a thermostat lead connected to the jacket power lead and a thermostat connected to the thermostat lead, and means securing the thermostat to a side wall of an aircraft.

2. The battery assembly of claim 1 including: a mounting plate fixed to the thermostat, said mounting plate being securable to the side wall of the aircraft.

3. The battery assembly of claim 1 including: a silicone rubber sheath encapsulating the thermostat, and means for securing the sheath to the side wall of the aircraft.

4. The battery assembly of claim 1 wherein: said jacket provides a total wattage of between 0.9 and 2.00 watts per pound of battery.

5. The battery assembly of claim 1 including: means for mounting the thermostat proximate the top of the battery in the battery box to sense ambient temperature immediately proximate the battery.

* * * * *